(12) United States Patent
Van Wel (10) Patent No.: US 8,108,658 B2
(45) Date of Patent: Jan. 31, 2012

(54) DATA PROCESSING CIRCUIT WHEREIN FUNCTIONAL UNITS SHARE READ PORTS

(75) Inventor: Antonius Adrianus Maria Van Wel, Den Bosch (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 258 days.

(21) Appl. No.: 11/575,501

(22) PCT Filed: Sep. 21, 2005

(86) PCT No.: PCT/IB2005/053102
§ 371 (c)(1),
(2), (4) Date: Sep. 29, 2008

(87) PCT Pub. No.: WO2006/033078
PCT Pub. Date: Mar. 30, 2006

(65) Prior Publication Data
US 2009/0070559 A1    Mar. 12, 2009

(30) Foreign Application Priority Data
Sep. 22, 2004 (EP) .................................. 04104582

(51) Int. Cl.
*G06F 13/14* (2006.01)
(52) U.S. Cl. ............................. 712/225; 712/24; 712/33
(58) Field of Classification Search ............... 712/24, 712/33, 225, 235
See application file for complete search history.

(56) References Cited

U.S. PATENT DOCUMENTS

| 6,076,154 | A | 6/2000 | Van Eijndhoven et al. |
| 7,574,583 | B2 * | 8/2009 | Leijten et al. .................... 712/24 |
| 2004/0014848 | A1 | 1/2004 | Tanaka et al. |
| 2004/0029796 | A1 | 2/2004 | Szeto et al. |
| 2004/0128475 | A1 * | 7/2004 | Sheaffer ........................... 712/32 |
| 2004/0148488 | A1 | 7/2004 | Pechanek et al. |

FOREIGN PATENT DOCUMENTS

WO  2004029796 A2  4/2004

OTHER PUBLICATIONS

Lee R. et al; "PLX: a fully subword-parallel instruction set architecture for fast scalable multimedia processing", Proceedings of the 2002 IEEE International Conference on Multimedia and Expo, vol. 2, Aug. 2002, pp. 117-120, XP010604711.

* cited by examiner

*Primary Examiner* — William M Treat (57) ABSTRACT

A data processing circuit comprises a register file (14) having read ports and write ports. A plurality of functional units (21a-c), is coupled to receive operand data from a same combination of read ports. Each functional unit is coupled to a respective one of the write ports for writing a respective result. An instruction issue slot has outputs (11) for supplying register selection information to said combination read ports and to the respective ones of the write ports. The output of the issue slot also supplies an operation code. The functional units (21a-c) in the plurality are arranged to respond to at least to one value of the operation code by each executing a respective operation using the same operands from said same combination and each functional unit producing a respective result at a respective ones of the write ports.

11 Claims, 4 Drawing Sheets

DATA PROCESSING CIRCUIT WHEREIN FUNCTIONAL UNITS SHARE READ PORTS

The invention relates to a data processing circuit and to a method of executing programs using such a data processing circuit.

From U.S. Pat. No. 6,076,154 it is known to provide a VLIW data processing circuit with a plurality of issue slots. VLIW (Very Long Instruction Word) processors use instruction issue circuits that issue instructions composed of a plurality of operations in parallel to a plurality of functional units. Information that specifies respective operations is issued in respective issue slots of the instruction issue unit. Each issue slot supplies an operation code, which identifies the operation, and a plurality of register selection codes, which specify the locations of registers in a register file from which operands of the specified operation must be loaded and/or results of the specified operation must be written. A register file may be composed of one or more independent register files parts, which are each register files in there own right. The register selection codes for the operands are supplied to read ports of the register file. In return the read ports supply the operands. The operation code is supplied to a functional unit, which applies the specified operation to the operands and applies a result of the operation to a write port of a register file. A register selection code from the issue slot is supplied to the write port to control the register in which the result is written.

In many practical VLIW processors, respective groups of functional units are coupled to respective issue slots. The functional units in a group have operand inputs coupled to the same read ports of the register file and result outputs coupled to the same write port of the register file. When a group of functional units is attached to an issue slot, the operation code determines which of the functional units from the group will perform an operation and write the result of that operation in response to the operation code. If the relevant functional unit is capable of executing different operations, the operation code also selects the operation within the functional unit.

The use of a VLIW processor has the advantage that instructions can be executed in parallel, which reduces the time needed to execute a program. However, this comes at the price of more hardware, for example to realize multiple issue slots, than is needed in single instruction issue processors. The total amount of power that a VLIW processor consumes for the execution of a program that performs a given task is generally at least the same as the power consumed for executing the same task with a single instruction issue processor. Generally the power per program is higher because in many instructions some of the issue slots remain unused. Furthermore, the memory space occupied by a VLIW program that performs a given task is generally at least the same as the memory space for a program for the same task for a single instruction issue processor. Generally the required memory space is larger, due to unused code space.

Among others, it is an object of the invention to reduce the amount of memory space that is required to store a program for making a programmable processor circuit perform a given task.

Among others, it is an object of the invention to reduce the total amount of power that is required to make programmable processor circuit perform a given task.

The data processing circuit of the invention is set forth in Claim 1. According to the invention a plurality of functional units corresponding to one issue-slot receive at least one and preferably two or more operands from shared one or more read ports of a register file. The plurality of functional units produce respective results at different write ports to the register file. An operation code issued to the plurality of functional units controls whether and/or in which combination the plurality of functional units simultaneously perform operations using the operand or operands from the shared read port or read ports. Thus a single issued command, controls a plurality of functional units simultaneously, using a shared register address for at least one and preferably two or more shared operands of the different functional units. In this way fewer commands are needed in programs for the data processing circuit, which reduces both the amount of memory needed for storing the program and the power consumption required to execute the combination of instructions. A command comprises an operation code and its corresponding register addresses for input operand(s) and result(s).

Preferably further functional units are coupled to the issue slot in parallel with the plurality of functional units, so that in addition to the operations that involve simultaneous execution of different operations using the same operands other operations can be selected as well. Preferably, different values of the operation code select respective different, not necessarily non-overlapping pluralities from the group of functional units, that involve simultaneous execution of different operations using the same operands. This increases the opportunities for using commands that control a plurality of functional units in a program, using a shared register addresses for operands of the different functional units. This results in fewer commands in the program.

Preferably, both primary operation codes are supported that cause only one of the functional units to perform an operation at a time using operands from the read port or read ports and secondary operation codes that cause a plurality of functional units to perform an operation simultaneously using shared operands from the read port or read ports. This makes it possible to avoid using operations that involve a plurality of functional unit if results from only one of the functional units are needed in a program. It also makes it possible to limit the number of operation codes that result in simultaneous execution by a plurality of functional units using shared operands, without sacrificing the possibility to execute any operation if necessary on its own. In this way the total number of instructions can be kept small by introducing operation codes that result in simultaneous execution only for the most frequently occurring combinations.

In an embodiment the write ports have respective different result word sizes. Thus different operations that produce different word sizes from the same operands, such as multiplications and additions can be executed simultaneously using the same operands. Preferably the register file comprises a plurality of parts, coupled to respective ones of the write ports, each part containing registers of a respective word size to receive the different results.

In another embodiment a further functional unit is coupled to the write port of register file parts that have mutually different word sizes to write versions that represent the same result with the first and second bit size to the first and second write port respectively. This makes it possible to use the results of an operation without requiring additional instructions for conversion. This reduces the number of instructions in a program. In a further embodiment the most significant part and a least significant part of the result are written to different write ports and the complete result is written to a third write port of a register file part with a larger word size. This makes it possible to use the results of an operation without requiring additional instructions for conversion.

These and other objects and advantageous aspects of the invention will be described in terms of non-limitative examples, using the following figures.

Figure 1:
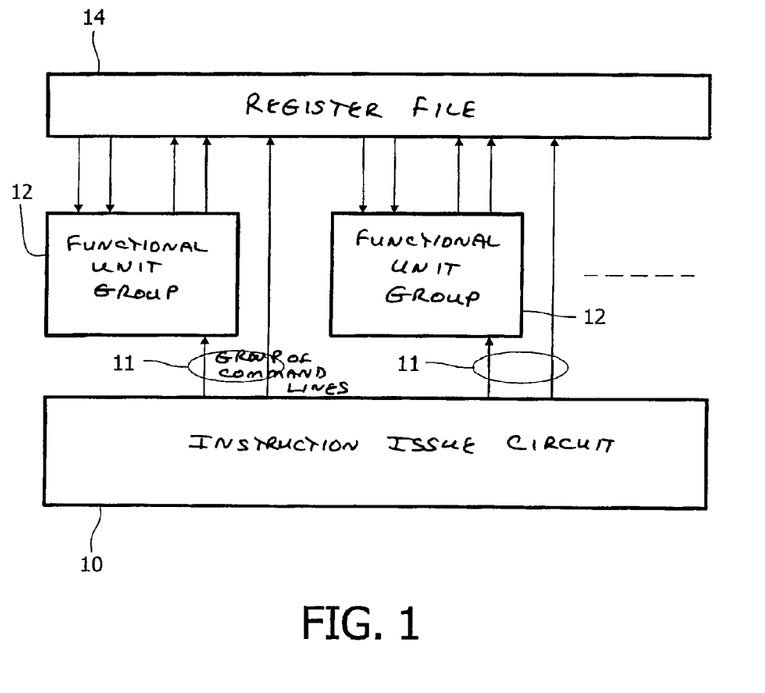
FIG. 1 shows a data processing circuit

FIG. 1 shows a data processing circuit comprising an instruction issue circuit 10, groups 12 of functional units and a register file 14. Instruction issue circuit 10 has a plurality of issue slots, each issue slot containing a group of command lines 11 coupled to a respective one of the groups of functional units 12 and to the register file 14.

The register file 14 contains a plurality of registers (not shown separately). The register file 14 has a plurality of read ports and a plurality of write ports (not shown in detail). Each read port contains connections for receiving a register address and connections for returning bits of the data stored in the addressed register. Each write port contains connections for receiving a register address and connections for receiving bits of the data that has to be stored in the addressed register. For the sake of clarity single lines are shown in the issue slots 11 to the respective register file 14, but it should be understood that each single line represents a plurality of connections to respective read and/or write ports for addressing a plurality of registers.

Each group of functional units 12 has a command input coupled to a respective one of the issue slots and operand inputs and result outputs coupled to the register file 14. Although two groups of functional units 12 are shown explicitly, more may be present, each coupled to a respective issue slot. For the sake of clarity single lines are shown for each port between respective register file 14 and functional units 12, but it should be understood that each single line represents a plurality of connections to and/or from a respective read and write ports, for supplying bits to and/or receiving bits from an addressed register.

Instruction issue circuits are known per se. Instruction issue circuit 10 is typically coupled to an instruction memory (not shown) and typically contains a program counter (not shown) that produces addresses of instructions in the instruction memory. Instruction issue circuit 10 receives these instructions and derives a plurality of commands from an instruction. Instruction issue circuit 10 issues the commands in parallel in respective issue slots 11. Each command contains an operation code, which is applied to a group of functional units 12, and a number of register selection codes, which are applied to register file 14. Each register selection code indicates a selected register in the register file to which the register selection code is applied. The register selection codes from an issue slot serve to select register locations of operands that are needed as input for the operation and register locations of registers wherein results of the operation will be stored. Although these register selection codes conceptually belong to a single command, it should be appreciated that in practice different register selection codes for a command may be issued offset in time with respect to one another, since they may be needed at different stages during execution of the command. This occurs during pipelining for example, when different part of the same command may be issued in different instruction cycles.

Figure 2A:
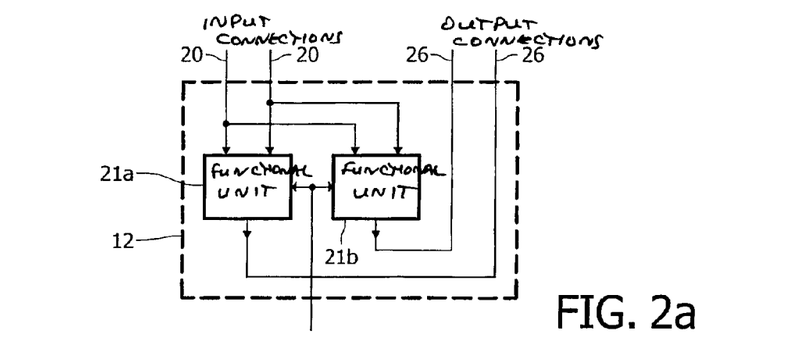
FIG. 2a-c shows groups of functional units

FIG. 2a shows an example of a functional unit group 12. Group 12 contains two functional units 21a,b. Two input connections 20, are shown for receiving respective operands from the register file (not shown). Input connections 20 are coupled to both functional units 21a,b. Two output connections 26 are shown for supplying results to the first register file (not shown). Each output connection is coupled from the output of a respective one of the functional units 21a,b. Although single lines are used to represent the connections, it should be understood that each connection typically contains a respective plurality conductors, each conductor for a respective bit, so that each connection to the register file contains for example thirty-two conductors.

In operation, each command for the group of FIG. 2 contains register addresses for two operands and register addresses two results. When instruction issue circuit 10 encounters an instruction with a command, instruction issue circuit 10 issues the operation code of this command to a group of functional units 12, two operand register addresses to read ports of register file 14 and two result register addresses to write ports of register file 14. In response the register file 14 retrieves two operands. Register file 14 applies these operands from its read ports to both functional units 21a,b.

The operation code of the command may assume different values, that select different operations. At least one value causes both functional units 21a,b to perform respective operation on the same operands that have been received from register file 14. In response to this value of the operation code the functional units 21a,b write results to the connections 26 to the respective write ports.

In one embodiment first functional unit 21a contains an adder circuit and second functional unit 21b contains a subtractor circuit, so that the sum and the difference of the operands are output as respective results. The adder and subtractor circuit may be part of respective programmable arithmetic units (or arithmetic and logic units) in the respective functional units. In this case the functional units 21a,b may be arranged to select respective arithmetic operations that will be performed in response the operation code on the same operands.

In another embodiment first functional unit 21a contains a circuit that selects and outputs that one of the operands that represents the smallest number of both operands and second functional unit 21b contains a circuit that selects and outputs that operand that represents the highest number of both operands, so that the minimum and the maximum of the operands are output as respective results. In yet another embodiment first functional unit 21a contains an adder circuit and second functional unit 21b contains a shift circuit, so that a sum of the operands and a shifted version of one of the operands are output as respective results.

Of course the invention is not limited to the specific type of group of functional unit that is shown in the figures. For example, more than two read ports may be coupled to a group of functional units 12 and to each of the functional units 21a,b in that group. In this way the functional units can be arranged to execute more complicated operations in response to specific values of the operation code.

Figure 2B:
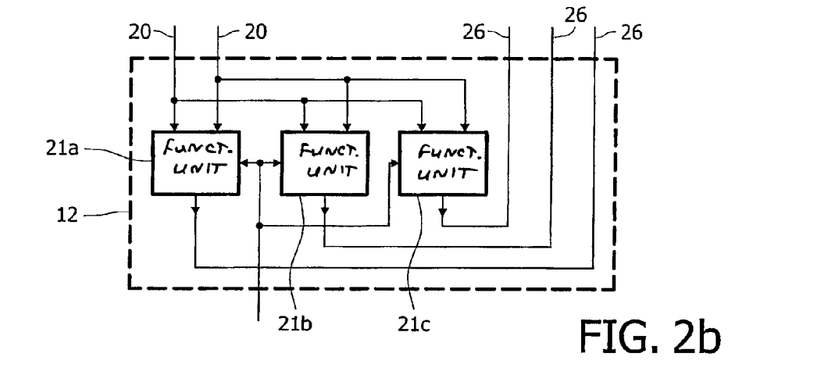

FIG. 2b shows an alternative embodiment wherein three respective functional units 21a-c are coupled each coupled to the same connections 20 to read ports of the register file (not shown). The group has three connections 26 to respective write ports of the register file (not shown). All three functional units 21a-c are coupled to the issue slot to receive the operation code. In this embodiment, each command for the functional unit contains three result register addresses. The result register addresses are issued through issue slot 11 to three respective write ports of the register file. The functional units 21a-c respond to at least one value of the operation code by executing respective operations using the same operands from connections 20. It should be understood that any larger number of functional units can be coupled to the same read ports and a respective write ports to execute respective operations in response to an operation code.

Figure 2C:
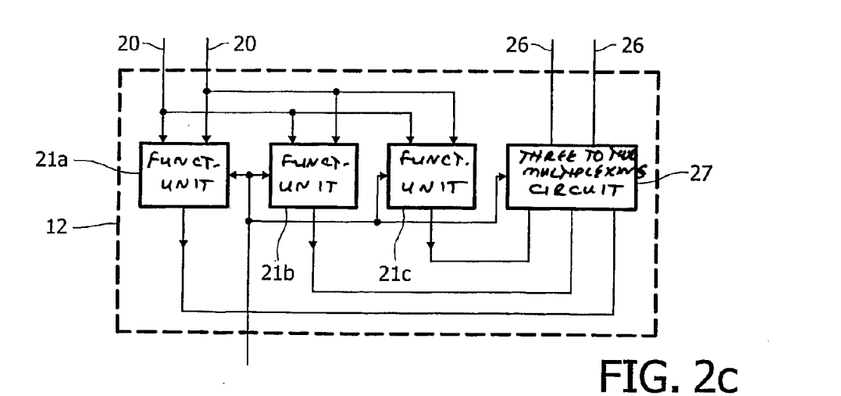

FIG. 2c shows an embodiment wherein a three to two multiplexing circuit 27 has been added between the result outputs of the functional units 21a-c. In this embodiment group 12 has two outputs 26 coupled respective write ports of the register file (not shown). In this embodiment, each command for the functional unit contains two result register addresses and the operation code controls from which of the functional units 21a-c the results will be written to the register file. The operation code controls multiplexing circuit 27 to supply the results from the selected functional units 21a-c to the connections 26 to the write ports. Each functional units 21a-c may be arranged to disable itself in response to the operation code, if the operation code indicates that the result of that functional unit 21a-c is not supplied to a write port. Of course a greater number N than three functional units 21a-c may be combined in this way and any number M of connections greater than one and less than N to respective write ports may be used. The multiplexing circuit may be arranged to realize arbitrary connections between its inputs and outputs. But in an embodiment the multiplexing circuit may be arranged to provide only partial connections, for example by connecting one functional unit 21a always to one output 26, and an operation code selected one of the other functional units 21b-c to the other output 26.

In this embodiment different operation codes may be used to select different pluralities of M functional units (M=2 for example) from N functional units 21a-c (N=3 for example) to produce M results using at least partly operands from the same read ports.

In some embodiments wherein a group 12 is coupled to a plurality of read ports, for example to three or more read ports, it is not necessary that all functional units 21a,b use operands from all read ports in response to a specific value of the operation code. For example, in response to a specific value of the operation code only a number of core operands from the read ports may be used by all functional units, the remaining operands being used by selected functional units only.

Furthermore, it is not necessary that all operation code values have the effect that a plurality of functional units operates to produce results. At least part of the operation code values may have the effect that only one of the functional units 21a-b of the group 12, or less than the number M of functional units 21a-c that are able to write results in parallel will be activated to use the operands to produce a result. For this purpose a dummy functional unit may be provided in the group, the dummy functional unit being designed to output a standard result at an unused write port in response to such operation code values.

The figures show an embodiment wherein the input of the group 12 for the operation code is connected directly to the different functional units 21a-c. In this embodiment, each functional unit 21a-c (and optionally multiplexer 27) contains a decoder circuit (not shown) that translates the operation code into control signals for operative circuits (not shown) of the functional unit 21a-c that process the operands. In another embodiment, a common decoder circuit may be provided that translates the operation code into control signals for operative circuits (not shown) of a plurality of the functional unit 21a-c.

In an embodiment the different functional units 21a-c of a group are each programmable, that is, each is able to execute different selectable operations. In such an embodiment the operation code of a command may comprise different fields, each field comprising an operation code that is capable of selecting any one of the selectable operations for a respective one of the functional units 21a-c in the group. However, this may lead to operation codes of considerable size. Therefore, preferably the available operation codes are selected to make available only selected ones of all possible combinations of the selectable operations of the individual functional units 21a-c. For example, primary operation code values may be that make individual functional units perform any of their selectable operations leaving the other functional units 21a-c passive, plus a number of secondary operation code values of which each value activates a combination of the functional units 21a-c to perform different operations using the same operands. In this case the number of different secondary operation code values may be considerably less than the total number of possible combinations, operation codes being available only for combinations that occur frequently in typical programs for example.

Although the invention has been described for an embodiment with a register file wherein all registers store words of the same size, this is not necessary. In another embodiment, the register file 14 may be composed of a plurality of parts (each of which forms a register file in its own right, with read and write ports). Each respective part contains registers of a respective word size, the respective word sizes of the different parts may be different.

Figure 3:
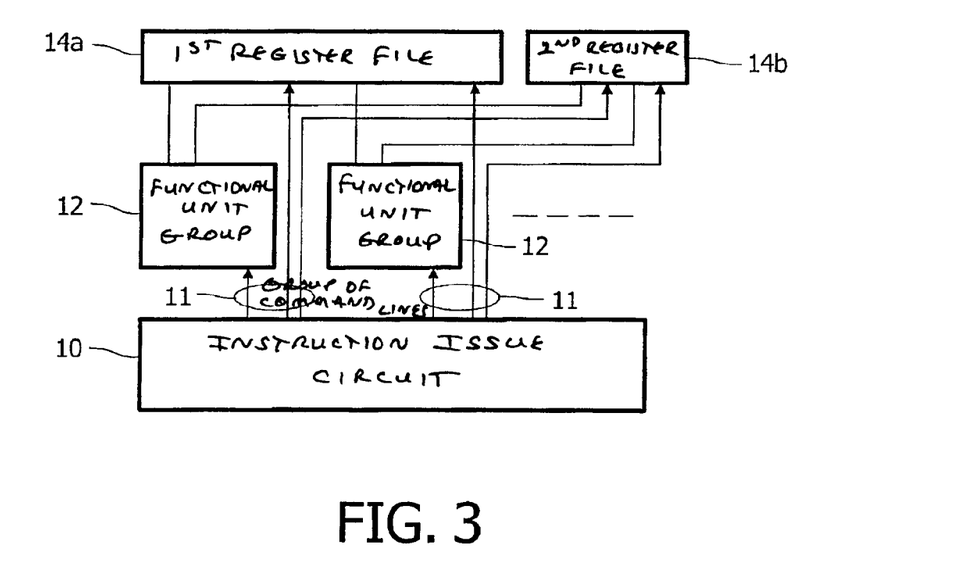
FIG. 3 shows a data processing circuit

FIG. 3 shows a data processing circuit comprising an instruction issue circuit 10, groups functional units 12 and a first and second register file 14a,b. Each register file 14a, b contains a plurality of registers (not shown separately). Each register in the first register file 14a stores a first number of bits (for example thirty two bits). Each register in the second register file 14b stores a second number of bits, which is larger than the first number (for example sixty four bits).

Each register file 14a,b has a plurality of read ports and a plurality of write ports (not shown in detail). Each read port contains connections for receiving a register address and connections for returning bits of the data stored in the addressed register. Each write port contains connections for receiving a register address and connections for receiving bits of the data that has to be stored in the addressed register.

For the sake of clarity single lines are shown in the issue slots 11 to the respective register files 14a,b, but it should be understood that each single line represents a plurality of connections to respective read and/or write ports for addressing a plurality of registers. Each group of functional units 12 has a command input coupled to a respective one of the issue slots and operand inputs and result outputs coupled to the register files 14a,b. Although two groups of functional units 12 are shown explicitly, more may be present, each coupled to a respective issue slot. For the sake of clarity single lines are shown between respective register files 14a,b and functional units 12, but it should be understood that each single line represents a plurality of connections to and/or from respective read and write ports, for supplying bits to and/or receiving bits from a plurality of registers.

When a group 12 of the type of FIG. 2a-c is used in the circuit of FIG. 3, different ones of the functional units 21a-c may be arranged to produce results with mutually different word sizes. For example, one functional unit may be an arithmetic unit that has n-bit operand words and produces n-bit result words, whereas another one of the functional units 21a-c may be a multiplier that has n-bit operand words and produces 2n-bit result words (n=32 for example).

Figure 4:
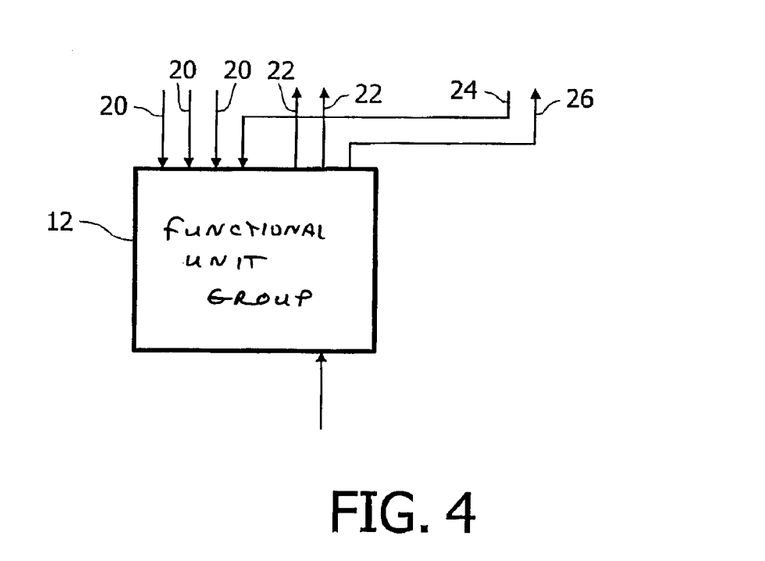
FIGS. 4-7 show parts of a functional unit

FIG. 4 shows an example of a functional unit group 12, wherein the connections for supplying respective operands from the read ports of the register files 14a,b (not shown) are shown separately. Four input connections 20, 24 are shown for receiving operands. Three first input connections 20 are coupled to a first register file 14*a* (not shown) and one second input connection is coupled to a second register file 14*b*. Two first output connections are coupled to the first register file 14*a* and one second output connection is coupled to the second register file 14*b*. Although single lines are used to represent the connections, it should be understood that each connection typically contains a respective plurality conductors, each conductor for a respective bits, so that each connection to first register file 14*a* contains for example thirty-two conductors and each connection to second register file 14*b* contains for example sixty-four conductors.

Typically group 12 will contain a plurality of functional units coupled at least partly to the same operand inputs 20 and arranged to produce respective results, as described with respect to FIGS. 2*a-c*.

Figure 5:
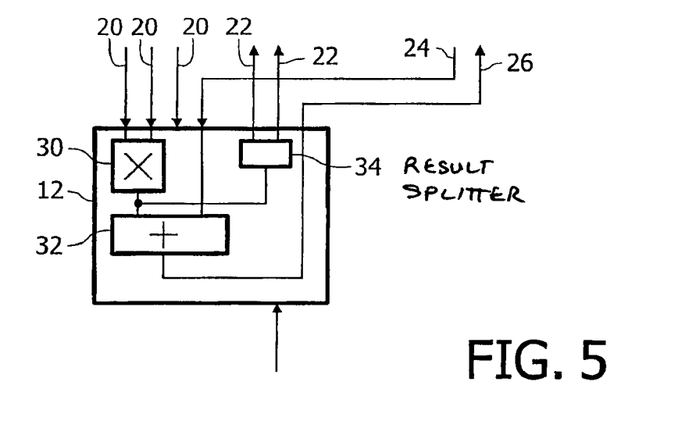

FIG. 5 shows an embodiment wherein at least one of the functional units in a group 12 uses a result produced by another one of the functional units. The functional unit contains a multiplier 30, an adder 32 and a result splitter 34. Data parts 20 of first and second read ports of first register file 14*a* (not shown) are coupled to respective inputs of multiplier 30. Each of the inputs contains conductors for supplying a first plurality of N bits in parallel (N=32 for example). An output of multiplier 30 and a data part 24 of a read port from second register file 14*b* (not shown) are coupled to the inputs of adder 32. Each of the inputs of adder 32 contain conductors for supplying a first plurality of 2*N bits in parallel (2*N=64 for example). The output of adder 32 contains conductors for supplying 2*N bits of an addition result in parallel (2*N=32 for example). The output of adder 32 is coupled to the data part 26 of the write port to the second register file 14*b* (not shown) Result splitter 34 splits branches of the conductors of the outputs from multiplier 30 into two groups, of N most significant bits and N least significant bit respectively. The command for this MADD instruction may be denoted by

MADD R1, R2, R3, R4, R5, R6

Herein MADD symbolizes the operation code, R1, R2 symbolize the register addresses that are applied to read ports of first register file 14*a*, R3 symbolizes the register address that is applied to the read port of second register file 14*b*, R4, R5 symbolize the register addresses that are applied to write ports of first register file 14*a* and R6 symbolizes the register address that is applied to the write port of second register file 14*b*. The command that is retrieved by instruction issue circuit 10 preferably contains a plurality of bits that can be divided into respective fields that represent the operation code and the respective register addresses.

As can be understood the MADD command involves three result registers that are all separately selected by register addresses in the issued instruction. The different result registers can be addressed separately by later instructions to use (part of) the result. In another embodiment, the two N bit outputs may be combined into a single 2*N output coupled to a register file 14*b* with 2*N bit words.

A further functional unit may be present in a group that writes multiple results to different write ports. In this case a multiplexer may be provided to select whether a plurality of different functional units that operate on the same operands are coupled to respective write ports, or whether one functional unit that produces multiple results are coupled to the different write ports. Of course such a further functional unit may be used by itself (i.e. not coupled to the same write ports to which different functional units are coupled that share the same operands). The combination of such a further functional unit with result outputs coupled to the same write ports to which different functional units are coupled that share the same operands has the advantage that more efficient use can be made of the write ports.

Figure 6:
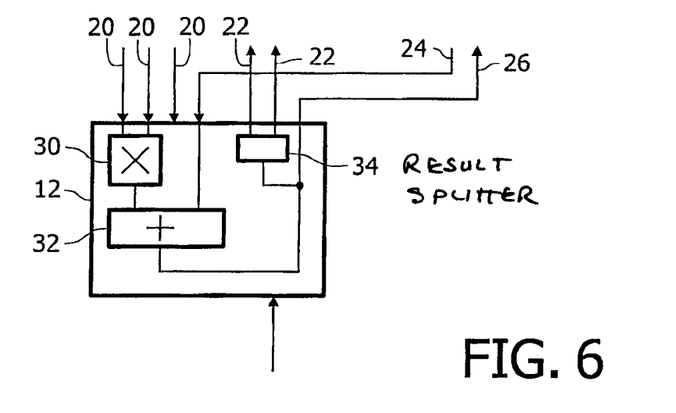

FIG. 6 shows a part of a functional unit that is activated in response to another type of MADD (Multiply Add) instruction. The functional unit contains a multiplier 30, an adder 32 and a result splitter 34. Data parts 20 of first and second read ports of first register file 14*a* (not shown) are coupled to respective inputs of multiplier 30. Each of the inputs contains conductors for supplying a first plurality of N bits in parallel (N=32 for example). An output of multiplier 30 and a data part 24 of a read port from second register file 14*b* (not shown) are coupled to the inputs of adder 32. Each of the inputs of adder 32 contain conductors for supplying a first plurality of 2*N bits in parallel (2*N=64 for example). The output of adder 32 contains conductors for supplying 2*N bits of an addition result in parallel (2*N=32 for example). The output of adder 32 is coupled to the data part 26 of the write port to the second register file 14*b* (not shown), and to respective data parts 22 of the second register file 14*b*, which receives the N most significant bits of the result and the N least significant bits of the result respectively. Result splitter 34 merely splits branches of the conductors of the outputs from adder 32 into two groups, of N most significant bits and N least significant bit respectively. The command for this MADD instruction may be denoted by

MADD R1, R2, R3, R4, R5, R6

Herein MADD symbolizes the operation code, R1, R2 symbolize the register addresses that are applied to read ports of first register file 14*a*, R3 symbolizes the register address that is applied to the read port of second register file 14*b*, R4, R5 symbolize the register addresses that are applied to write ports of first register file 14*a* and R6 symbolizes the register address that is applied to the write port of second register file 14*b*. The command that is retrieved by instruction issue circuit 10 preferably contains a plurality of bits that can be divided into respective fields that represent the operation code and the respective register addresses.

As can be understood the MADD command has the effect that the same result is written twice: once as a whole to a register in second register file 14*b* and once in two parts to respective registers in first register file 14*b*. This involves three result registers that are all separately selected by register addresses in the issued instruction. This gives the compiler that compiles the program of instructions for the processing circuit complete freedom to optimize register use. The different result registers can be addressed separately by later instructions to use (part of) the result, without need of prior conversion. The N-bit result registers may be used for example in one group of functional units and the 2*N bit result may be used for example in another group of functional units.

It should be understood that the MADD command is only one example of commands that may be applied to the issue slots. Different commands may be available as well. The different commands are identified by the operation code part of the command (symbolized by MADD in the example of the MADD command). Dependent on the specified command, different circuits (not shown in FIG. 3) of a functional unit may be activated, or different functional units from a group of functional units that is connected to the same issue slot may be activated. Typically, the functional unit (or group of functional units) contains multiplexers (not shown) to determine from which of the circuits outputs are applied to the outputs of the functional unit and/or to other circuits in the functional unit. The figure merely shows the circuits that are involved with the MADD command. Other commands may use as many, or fewer, or more registers as operand registers and/or may use as many, or fewer, or more registers as result registers. When fewer registers are used, default register selection codes may be issued and the register files 14*a,b* may be arranged to supply default data in response to these selection codes, or to prevent modification of the content of any register in response to a default selection code.

Figure 7:
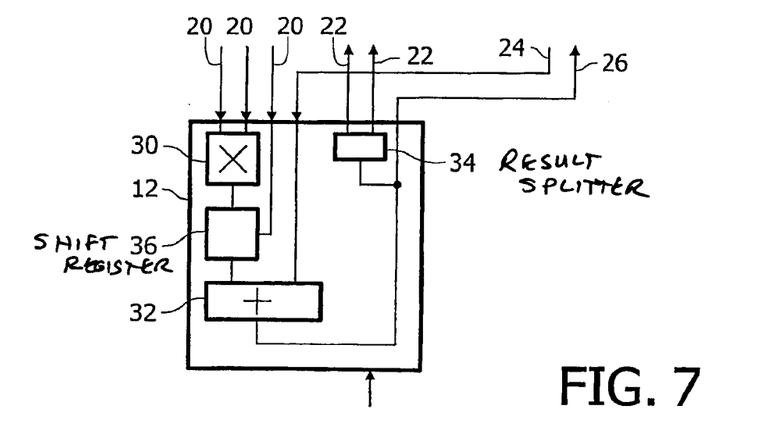

FIG. 7 shows an alternative part of a functional unit that is activated in response to a MSHADD instruction (Multiply-Shift-Add). This functional unit contains a barrel shifter 36 between multiplier 30 and adder 32 to shift the product by a number of bit positions that is controlled by a further operand from a data part 20 of a read port of first register file 14*a*. The MSHADD instruction uses the maximum number of inputs and outputs allowed by the issue slot.

Although the invention has been described by reference to specific embodiments, it should be understood that the invention is not limited to these embodiments. For example, instead of two register files 14*a,b*, a larger number of register files may be used, for example a group of register files with N bit registers and a group of register files with 2*N bit registers. In this case, different (groups of) functional units and their corresponding issue slots may be coupled to respective different register files. A single group of functional units may even be connected to multiple register files with N bit or 2*N bit registers.

Preferably all issue slots have the same width, each supporting the same number of operand registers (with respective different operand sizes) and the same number of result registers (with respective different operand sizes). This has the advantage that during compilation the assignment of instructions to different issue slots can be freely used to optimize processor speed. Preferably, each issue slot supports three result registers, of which two are N bit wide and one is 2*N bits wide (N=32 for example). This has been found to provide a good compromise between the overhead involved with multiple results and programmability with the same numbers of result registers in multiple issue slots. Preferably four operand registers are used, of which three are N bit wide and one is 2*N bit wide. This has been found to provide a good compromise between the overhead involved with multiple operands and programmability with the same numbers of result registers in multiple issue slots.

In another embodiment more than two different multi-bit operands and/or result sizes may be used in an issue slots. For example, in addition to the register file with thirty-two bit registers and the register file with the sixty-four bit registers a register file with eight bit registers may be provided and addressed in an issue slot.

Preferably at least two register file are used connected to the same functional unit and controlled from the same issue slot, wherein number of bits N per register in one register file is half the number 2N of bits per registers in the other. This makes it possible to write a double precision version of a result and two single precision parts of the result with mutually the same size as a result of one instruction. However, without deviating from the invention register files may be used wherein the register size is not a factor two different. For example, the size of the registers in the first register file may be N+1 bits and the size of the registers in the second register file may be 2*N+1 bits, to be able to represent overflow in each of the registers.

The invention claimed is:

1. A data processing circuit, the data processing circuit comprising
   a register file having read ports and write ports;
   a plurality of functional units, each functional unit corresponding to one issue-slot, each functional unit being coupled to a respective one of the read ports, and each functional unit being coupled to a respective one of the write ports for writing a respective result;
   at least one instruction issue slot having outputs for supplying register selection information to the respective ones of the read ports and to the respective ones of the write ports, and an output for an operation code, the functional units of the plurality being coupled to the output for the operation code;
   wherein the operation code includes either a primary operation codes that cause only one of the functional units to perform an operation at a time or a secondary operation codes that cause a plurality of functional units to perform an operation simultaneously,
   wherein the functional units are arranged in groups of functional units such that different values of the operation code select respective groups of functional units to enable execution of complicated operations in response to a single operation code and said groups correspond to specific types of command codes, and to receive operand data containing at least one shared operand from at least one read port shared by the functional units; and,
   the functional units associated with a same instruction issue slot are arranged to simultaneously respond to a value of the operation code by each executing a respective operation using the at least one shared operand, each functional unit of the plurality producing a respective result, obtained by processing the at least one shared operand, at a respective one of the write ports.

2. A data processing circuit according to claim 1, comprising a group of functional units that comprises said plurality of functional units and at least one further functional unit, each of said group of functional units being coupled to simultaneously receive operand data including at least one shared operand from the at least one shared read port, and each of said group of functional units being coupled to at least one of the write ports for writing a respective result, each of said group being coupled to the output for supplying the operation code, and arranged to respond to the operation code by each executing operations selected by the operation code.

3. A data processing circuit according to claim 2, comprising a multiplexing circuit coupled between the group of functional units which contains N functional units, N being an integer greater than two, and M write ports, M being an integer greater than one and smaller than N, wherein different values of the operation code select respective different, not necessarily non-overlapping pluralities of M functional units from the group, the functional units from the group being arranged to respond to respective values of the operation code, to each respective value so that the M functional units from a respective one of the pluralities execute operations using the at least one shared operand from the at least one shared read port and the functional units, the multiplexing circuit being arranged to feed M results to the respective ones of the write ports, from functional units selected by the respective values of the operation code.

4. A data processing circuit according to claim 1, wherein the functional units from the plurality are arranged to respond to respective further values of the operation code so that in response to each respective further value a respective one of the functional units executes a respective operation using at least one shared operand from the at least one shared read port, the functional units in the plurality other than said respective one of the functional units not using the at least one shared operands from said at least one shared read port to produce a result at the write ports in response to the respective further value.

5. A data processing circuit according to claim 1, wherein the at least one shared read port contains two read ports from which at least two operands are used by each of the plurality of functional units in response to said value of the operation code.

6. A data processing circuit according to claim 1, wherein the write ports have respective result word sizes, at least one of the write ports having a result word size that differs from the result word size of at least a further one write ports.

7. A data processing circuit according to claim 6, wherein the register file comprises a plurality of parts, coupled to respective ones of the write ports, each part containing registers of a respective word size that corresponds to the word size of the write port to which said part is coupled.

8. A data processing circuit according to claim 1, wherein the register file comprises a first and a second register file part, having registers of a first and second, mutually different bit size respectively, and the write ports comprising a first and a second write port for writing results to the first and second register file respectively; the data processing circuit comprising a further functional unit coupled to the first and second write port and to the instruction issue slot, the further functional unit being arranged to produce a result in response to the particular operation and to write versions that represent the result with the first and second bit size to the first and second write port respectively.

9. A data processing circuit according to claim 8, wherein the first plurality of bits consists of fewer bits than the second plurality of bits, the first register file part having a further write port, the first write port and the further write port receiving respective register selection codes from the issue slot in parallel, the functional unit having outputs coupled to the first write port and the further write port, the further functional unit being arranged to write a most significant part and a least significant part of the result to the first write port and the further write port respectively.

10. A data processing circuit according to claim 8, wherein the registers of the second register file have twice the bit size of the registers of the first register file.

11. A method of executing a computer program using a processing circuit that contains a plurality of functional units, the method comprising:
  issuing an instruction that indicates an operation code, addresses of operand registers and addresses of result registers;
  selecting registers using the addresses of the operand registers and supplying operands from the selected registers;
  arranging the functional units in groups of functional units such that different values of the operation code select respective groups of functional units to enable execution of complicated operations in response to a single operation code and said groups correspond to specific types of command codes;
  responding to said operation code by performing a plurality of operations in respective functional units associated with a same instruction issue slot simultaneously, each operation using operand data including at least one shared operand from the selected registers; and,
  writing respective results from the respective functional units to respective registers that are selected by the addresses of the result registers.

* * * * *